Patented Apr. 23, 1946

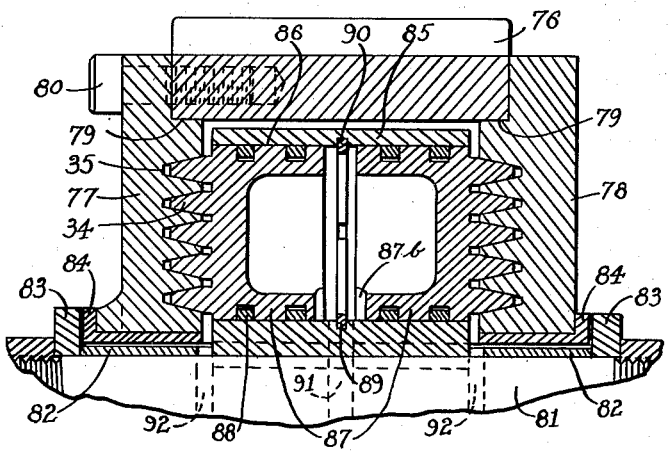
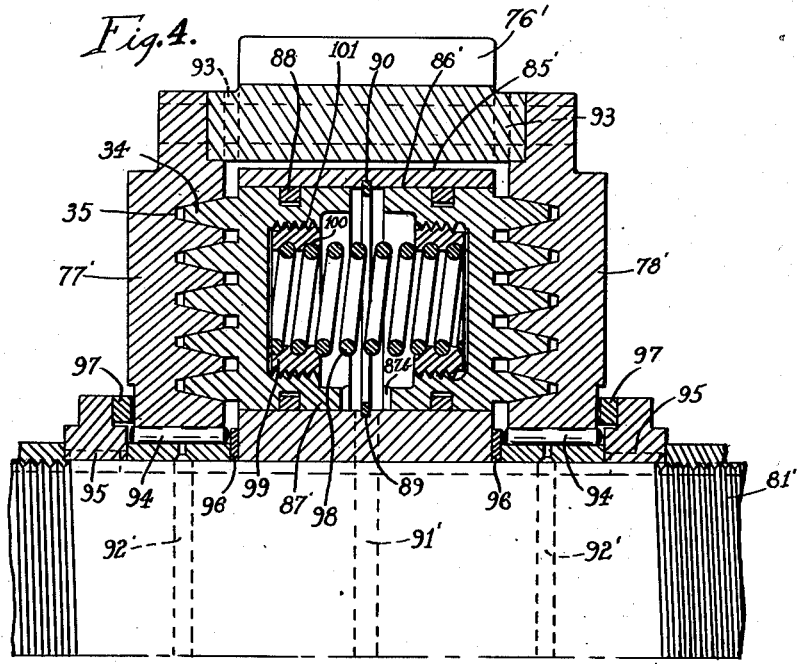

2,398,806

UNITED STATES PATENT OFFICE 2,398,806

CLUTCH

Heinrich Schneider, Hamilton, Ohio, assignor to Schneider Brothers Company, a copartnership composed of Heinrich Schneider and Viva Schneider, Hamilton, Ohio, and Adolf G. Schneider and Erna Schneider, Muncie, Ind.

Application April 27, 1942, Serial No. 440,630

11 Claims. (Cl. 192—86)

This application is a continuation in part of my copending application Serial No. 344,300, filed July 8, 1940.

This invention relates to clutches and is more particularly concerned with improvements in hydraulically or fluid pressure operated piston type clutches, which while suitable for use for various purposes are especially designed and adapted for use in combination with turbine drives, more particularly turbine ring converters. They may be used for transmitting extremely high torque with the application of high oil pressure on the pistons to connect and disconnect shafts, particularly in industrial applications.

The principal object of my invention is to provide a clutch of small and compact construction suitable for high power duty in the transmission of torque. When used in combination with turbine drives, the clutch can be further reduced in size by using very high oil pressure for engagement of the small friction areas of the clutch, inasmuch as the clutch is called upon to synchronize, in this combination, only a floating rotor of small inertia and to transmit high torque after the engagement of the clutch.

A salient feature of the clutch of my invention is its symmetrical design, whereby thrust is balanced internally so that thrust bearings can be eliminated, or at least substantially reduced in size.

Another object consists in the provision of a clutch of the kind mentioned in which the friction drive surfaces are made up of a multiplicity of small friction surfaces on interfitting V-shaped teeth and grooves on the relatively rotatable parts, all arranged to be well lubricated, cooled, and cleaned by the circulation of oil over the surfaces. In accordance with my invention, the piston heads in which the teeth are cut are made of softer material than the side plates of the drum in which the V-grooves are provided, so that there is little or no wear on the side plates and virtually all of the wear is taken on the pistons. The use of a multiplicity of small pistons as contemplated by my invention makes practical the use of high oil pressure which can be sealed effectively by piston rings, and it enables the individual adjustment of each piston into perfect engagement of its friction surfaces. The invention also permits fitting the pistons with some clearance in the bores, and excellent cooling of the multiplicity of small friction surfaces, as well as the friction plates.

Another object consists in the reduction of idling friction, which is still a problem with high speed multiple friction disk clutches, by providing for positive location of the pistons in disengaged position, providing plenty of clearance between the friction surfaces, and using cooling oil for controlled cooling of the friction surfaces in idling.

Another object consists in the reduction of the weight of the clutch, particularly in the thickness of the side plates of the drum, and limiting their deformation by the use of thrust rings rigidly secured to the shaft. Sufficient clearance between the thrust rings and the side plates in disengaged position is provided, so that during synchronization of the shaft and the drum the thrust rings are not engaged and only by further deformation of the side plates under high oil pressure the clearance is taken up and the thrust rings come into action.

Still another object consists in the provision of a clutch of the kind mentioned, especially designed and constructed to allow the arrangement of the clutch inside standard gear sizes, whereby it is possible to build transmissions consisting of hydraulic turbine drives in combination with multiple gear sets and reverse gears of small dimension and light weight for use in Diesel locomotives, army tanks, trucks, busses, and automobiles.

The foregoing and other objects of the invention are set forth in the following description, in which reference is made to the accompanying drawings, wherein—

Fig. 3 is a sectional detail on a larger scale, showing a piston clutch construction including thrust rings, and Fig. 4 is a section similar to Fig. 3 showing another construction, in which the pistons have a retracting spring connected thereto and the drum has provision for circulating oil between the friction drive surfaces.

Similar reference numerals are applied to corresponding parts throughout the views.

Figure 1:
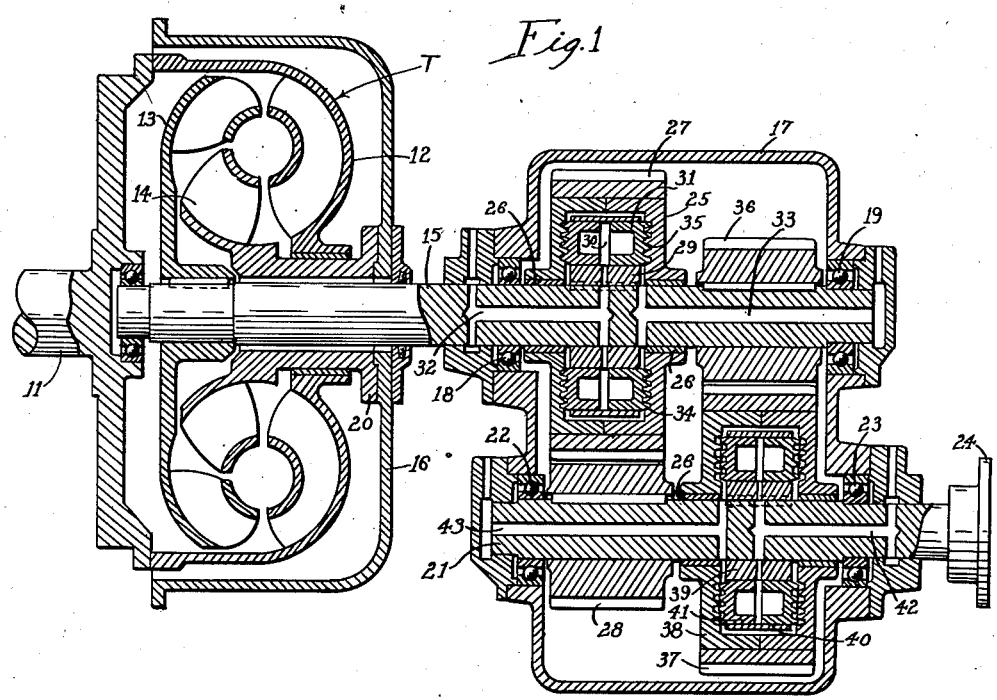
Figure 1 is a longitudinal section through a hydraulic transmission embodying piston clutches made in accordance with my invention.
Figure 2:
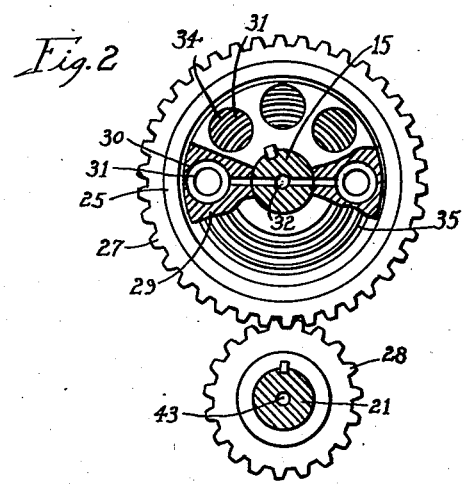
Fig. 2 is a cross-section of one of the two gear sets shown in Fig. 1.

Referring first to Figs. 1 and 2, 11 designates the primary or driving shaft, such as the crank shaft, of an engine or other prime mover and 12 is the impeller of a hydraulic torque converter T turning with the shaft 11. The torque converter includes a turbine wheel 13 and stationary reaction member 14. The turbine wheel 13 drives the secondary shaft 15 which extends from the torque converter housing 16 into the gear box housing 17, where it is received in bearings 18 and 19. The reaction member 14 is held stationary by a connection with the housing 16 as indicated at 20. 21 is a countershaft in the housing 17, received in bearings 22 and 23, and having a coupling flange 24 provided on the projecting end thereof for connection with the device to be driven, whether it be a vehicle or industrial machinery. A hollow clutch drum 25 is freely rotatable with respect to the shaft 15 on bearings 26 and has a ring gear 27 fixed on its periphery meshing with another gear 28 keyed on the countershaft 21. A hub 29 suitably secured to the shaft 15 has a plurality of longitudinal bores 30 provided therein in equally circumferentially spaced relation, all at the same radial distance from the axis of the shaft 15 and parallel thereto. Two oppositely facing pistons 31 are slidable in each of these bores and are adapted to be moved outwardly away from one another under oil pressure, oil being admissible through passages 32 to the bores 30 under high pressure to force the pistons 31 apart, and oil being admissible through other passages 33 under a lower pressure to the inside of the drum 25 to return the pistons when the high pressure is relieved. The pistons 31 have a number of concentric arcuate ridges 34 provided on their head ends, struck with the axis of the shaft 15 as a center and adapted to fit in corresponding circular grooves 35 provided on the side walls inside the drum 25, whereby the pistons 31 when forced outwardly under oil pressure engage their ridges in the grooves in the drum 25 to clutch the drum and turn it with the shaft 15. On the other hand when the oil pressure in the bores 30 is relieved and oil under pressure is supplied through the passages 33 to force the pistons 31 inwardly to retracted positions, the drum 25 will be accordingly released from driving connection with the shaft 15.

The gear 36 is keyed to the shaft 15 and meshes with another gear 37 fixed on the periphery of another clutch drum 38, similar to the drum 25 and mounted to turn freely with respect to the countershaft 21 on bearings 26. A hub 39 similar to the hub 29 is suitably secured to the countershaft 21 to turn therewith and has bores 40, similar to the bores 30 previously mentioned, with oppositely facing pistons 41 arranged to cooperate with the walls of the drum 38 similarly as in the hydraulic clutch previously described. It will be noticed that the pistons 41 are shown in disengaged relation to the drum 38, whereas the pistons 31 are shown in engaged relation to the drum 25. Passages 42 supply oil under high pressure to the bores 40 to force the pistons outwardly, whereas oil under low pressure is supplied through passages 43 to the inside of the drum 38 to return the pistons when the high pressure is relieved.

In operation, assuming that the high pressure passages 32 and 42 are at atmospheric pressure, whereas the passages 33 and 43 are continuously connected to the low pressure oil supply, thus keeping the pistons 31 and 41 in retracted relation to the drums 25 and 38, respectively, no connection exists between the gear 27 and shaft 15 on the one hand or the gear 37 and the shaft 21 on the other hand. Hence, if the impeller 12 of the torque converter T is driven, the turbine wheel 13 will rotate at its maximum speed and the gear pair 36—37, the motion of which is determined by the shaft 15, will also turn, the gear pair 27—28, the motion of which is determined by the countershaft 21, will stand still. If high pressure oil is supplied through passages 32 to force the pistons 31 outwardly into clutching engagement with the drum 25, the countershaft 21 will be turned at a speed above that of the shaft 15 determined by the speed ratio of the gears 27 and 28. If, on the other hand, the high oil pressure is relieved in passages 32 so as to allow the return of the pistons 31 under low pressure from the oil delivered through passages 33, the gears 27 and 28 are disconnected from driving relation with the shaft 15, and if thereafter oil under high pressure is delivered through passages 42 to move the pistons 41 into clutching engagement with the drum 38, the countershaft 21 will then be turned at a lower speed than the shaft 15 determined by the speed ratio of the gears 36 and 37. In other words, either of two different speed ratios may be selected. The important advantages of the invention will be apparent if one takes into consideration the fact that the countershaft 21 in the driving of a vehicle such as a locomotive is connected at 24 to heavy moving parts having large mass and large moment of inertia, and if one also takes into consideration the fact that the impeller 12 of the torque converter T is driven by a prime mover of also comparatively heavy mass and large moment of inertia. Two of the three independently movable systems cannot change their speeds suddenly without the application of a large force. The first of these systems is the engine whose shaft is shown at 11 and the attached pump impeller 12 of the torque converter, and the second of these systems comprises the driven masses of the main machinery (such as a locomotive) together with the countershaft 21 and attached hub 39 and gear pair 27—28. In the conventional clutch design, synchronization and connection must be established between these two systems directly when a clutch is engaged, and, due to the heavy masses of these systems, even a slight speed change in either system during the process of engagement necessitates dissipating a comparatively large amount of energy which must necessarily be lost as heat energy in the friction surfaces of the clutch. With the present invention, that highly undesirable condition is avoided because there is provided between the two masses a floating rotor of comparatively small mass and moment of inertia forming the third independently movable system. In Fig. 1, this third system comprises the turbine wheel 13 together with the secondary shaft 15 and the gear pair 36—37. When a clutch engagement occurs with the present gear box, it will establish a speed relation between the secondary shaft 15 and the countershaft 21 different from the one existing before the engagement. The forces necessary to bring about this change in speed will substantially be determined by the speed change of the secondary shaft 15 alone, the reason for this being that the masses attached to the countershaft 21 have a substantially larger moment of inertia than the masses attached to the shaft 15, forming the floating rotor, and I have found that in any kind of turbo-hydraulic machinery there is no appreciable resistance to a quick change in speed of one of the rotating members beyond the moment of inertia of the rotating wheels, the only additional resistance involved being the inertia resistance of the fluid particles, which is generally much smaller than the inertia resistance of the wheel changing its speed. As a result, whereas with other designs there must be a comparatively slow engagement in order not to impose any undue or even destructive stresses on the machinery, with the present design I have found it entirely feasible and practical to employ piston type clutches of the kind illustrated at 31 and 41, having considerably smaller frictional engaging surfaces but higher engaging pressures, these clutches being designed primarily for the function of transmitting power and only to a negligible extent as slip and heat consuming elements. The slip between the large masses of the prime mover on the one hand and the driven machinery on the other is absorbed in the torque converter T. I have found by extensive tests that with my invention, using these piston type clutches, engaging pressures several times that used in ordinary friction clutches of the disk type, and friction surfaces having an area a fraction of what was used in the ordinary friction clutches of the disk type can successfully be used in combination with a turbo ring drive. I have, for example, provided pistons having engaging surfaces of such small areas in relation to the fluid pressure applied, that the friction surface pressure in the clutch is upwards of 100 pounds per square inch. That makes it possible to use clutches of unusually small dimensions so that space, cost, and weight are greatly reduced. The smallness of the clutch units furthermore reduces the surface speed of the engaging faces, thus further reducing the danger of overheating, distortion, and scoring. Moreover, there is nothing to prevent the use of these clutches in conjunction with very high powered prime movers, and, in accordance with my invention, selective, multiple speed gear boxes can now be made for several thousand horse-power, in combination with a turbo-hydraulic drive. The quickness with which one may shift from one speed ratio to another with the present invention is also quite an advantage as compared with the performance of other transmissions available and insures an almost uninterrupted power flow.

The material of the pistons 31 and 41, in which the arcuate ridges or teeth 34 are cut, is preferably softer than the material of the drums 25 and 28 in which the mating annular grooves 35 are provided. Thus the pistons, or at least the head portions thereof, may be made of bronze or any composition material like those commonly used for clutch facings or brake linings, and the drums, or at least the side plates thereof, may be made of harder material such as steel, preferably hardened. There will, then, be little or no wear on the drums and virtually all the wear will be taken by the pistons. The included angle of the V-grooves 35 should be preferably between 20° and 30°. This construction, it will be understood, applies not only to the piston clutches disclosed in Figs. 1 and 2 but also to those illustrated in the other figures.

Referring now to Fig. 3, the piston clutch therein shown is similar to that disclosed in Fig. 1, except that the ring gear, indicated at 76, itself forms the peripheral wall of the drum, 77 and 78 being side plates mounting the ring gear on the annular shoulders 79 and secured to the opposite sides of the ring gear by means of bolts 80. The drum is rotatable freely with respect to the shaft 81, or vice versa, on bearings 82, 83 being thrust rings suitably supported against axial movement with respect to the shaft and engaged by the flanged end of bushings 84 turning with the drum. A hub 85 keyed, splined, or otherwise secured, to the shaft 81 has bores 86 provided therein parallel to the shaft axis and in equally circumferentially spaced relation and all at the same radius from the shaft axis, each containing a pair of pistons 87, which, like the pistons 31 and 41 in Fig. 1, have arcuate teeth or ridges 34 on their head ends arranged to engage in circular grooves 35 provided on the inner faces of the side plates 77 and 78. Piston rings 88 in the pistons minimize leakage of oil past the pistons in either direction, and a split ring 89 entered in an annular groove 90 at the middle of each of the bores 86 limits the movement of the pistons inwardly toward each other. Grooves 87b in the inner ends of the pistons afford communication between the bores 86 and the high pressure oil passages 91 extending radially in the shaft 81 and in the hub 85 into communication with the bores 86. At 92 are indicated the low pressure oil passages communicating with the inside of the drum on opposite sides of the hub 85.

In operation, when the passages 91 are at atmospheric pressure, the passages 92 being continuously connected to the low pressure oil supply will deliver oil to the inside of the drum and keep the pistons 87 in retracted position so that there is no driving connection between the gear 76 and shaft 81. Thrust rings 83 limit deformation of the side plates 77 and 78 when oil pressure is supplied through the passages 91 to force the pistons 87 outwardly into clutching engagement with the drum. There is normally appreciable clearance between the thrust rings and the side plates when the clutch is disengaged. In the initial engagement of the clutch during synchronization of the shaft 81 and the drum thrust rings will preferably not be engaged, but after synchronization, upon further deformation of the side plates under high oil pressure admitted through the passages 91, the clearance will be taken up and the thrust rings 83 will come into action and limit the deformation.

In the clutch shown in Fig. 4, the ring gear 76' is mounted on side plates 77' and 78', forming a drum around the hub 85' that turns with the shaft 81', similarly as in the structure of Fig. 3. However, in this clutch, it will be noticed that I have provided radial holes 93 in the ring gear, so that oil delivered to the inside of the drum through the radial passages 92' in the shaft 81' will serve not only to lubricate and cool needle bearings 94 provided for anti-friction support of the drum on the shaft but will also wash out through the drain holes 93 chips and dust from the inter-engaging V-shaped ridges and grooves 34 and 35 incident to the wear of the pistons 87'. The rings, indicated at 95 and 96, are hardened steel rings, and at 97 are indicated bronze thrust rings. A coiled tension spring 98 is provided for retracting each pair of pistons. On each end of the spring a steel ring 99 is screwed over the spring by means of internal grooves 100 in the rings, and the rings are then brazed to the spring and threaded into the pistons, as indicated at 101. To assemble the pistons in the bores, one piston in which the spring is tightly screwed is inserted from one side and the other piston is inserted from the other side and threaded onto the spring ring, using two wrenches, one on each of the pistons fitting between the teeth thereof.

The operation of this piston clutch is generally similar to that shown in Fig. 3, except that the springs 98 insure prompt disengagement of the clutch when the high pressure oil passages 91' are at atmospheric pressure. The springs retract the pistons 87' into engagement with the opposite sides of the rings 89, and grooves 87b in the pistons maintain communication between the bores 86' and the high pressure oil passages 91'. When oil is delivered under high pressure through the passages 91', the pistons 87' are moved outwardly against the action of the springs 98 for engagement of the clutch. The oil delivered continuously through the passages 98' keeps the parts well lubricated and also insures clearing out of chips and dust through the drain holes 93.

It is believed the foregoing description conveys a good understanding of the objects and advantages of my invention. The appended claims have been drawn to cover all legitimate modifications and adaptations.

I claim:

1. A clutch for use between a driving member and a driven member, comprising a hub turning with one of said members having bores provided therein substantially parallel to the axis of rotation, a pair of oppositely facing pistons in each bore, means for admitting fluid pressure to the bores between the pistons to force them outwardly for engagement of the clutch, and a drum turning with the other of said first mentioned members enclosing the hub and providing walls on opposite sides of the hub for frictional driving engagement with the head ends of the pistons, the walls having a plurality of concentric annular ridges and grooves provided therein struck with the axis of the hub as a center, and the head ends of said pistons having mating, concentric, arcuate grooves and ridges for interfitting frictional engagement of the head ends of the pistons with said walls in the engagement of the clutch.

2. A clutch for use between a driving member and a driven member, comprising a hub turning with one of said members having bores provided therein substantially parallel to the axis of rotation, a pair of oppositely facing pistons in each bore, means for admitting fluid pressure to the bores between the pistons to force them outwardly for engagement of the clutch, and a drum turning with the other of said first mentioned members enclosing the hub and providing walls on opposite sides of the hub for frictional driving engagement with the head ends of the pistons, the walls having a plurality of concentric, tapered, annular ridges and grooves provided therein struck with the axis of the hub as a center, and the head ends of said pistons having matching, concentric, arcuate grooves and ridges for interfitting wedging frictional engagement of the head ends of the pistons with said walls in the engagement of the clutch.

3. A clutch for use between a driving member and a driven member, comprising a hub turning with one of said members having bores provided therein substantially parallel to the axis of rotation, a pair of oppositely facing pistons in each bore, means for admitting fluid pressure to the bores between the pistons to force them outwardly for engagement of the clutch, and a drum turning with the other of said first mentioned members enclosing the hub and providing surfaces on the inside thereof on opposite sides of the hub for frictional driving engagement with the head ends of the pistons, the pistons having head portions of softer material in relation to the hardness of the material in those portions of the drum engaged by said pistons.

4. A clutch for use between a driving member and a driven member, comprising a hub turning with one of said members having bores provided therein substantially parallel to the axis of rotation, a pair of oppositely facing pistons in each bore, means for admitting fluid pressure to the bores between the pistons to force them outwardly for engagement of the clutch, a drum turning with the other of said first mentioned members enclosing the hub, interengageable friction means provided between said drum and said pistons adapted to be held in driving engagement under thrust of said pistons, whereby to transmit drive between said driving and driven members, the aforesaid fluid pressure means including a fluid passage in the hub communicating with the approximate mid-point of each bore, each of said bores having an annular groove provided therein at the mid-point narrower than the passage, and a split ring entered in the groove for limiting inward movement of the pistons.

5. A clutch for use between a driving member and a driven member, comprising a hub turning with one of said members having bores provided therein substantially parallel to the axis of rotation, a pair of oppositely facing pistons in each bore, means for admitting fluid pressure to the bores between the pistons to force them outwardly for engagement of the clutch, a drum turning with the other of said first mentioned members enclosing the hub, interengageable friction means provided between said drum and said pistons adapted to be held in driving engagement under thrust of said pistons, whereby to transmit drive between said driving and driven members, and a spring means interconnecting the pistons of each pair tending to urge the pistons inwardly toward each other.

6. A clutch for drivingly connecting a gear and shaft, comprising a hub turning with the shaft having bores provided therein substantially parallel to the axis of rotation, a pair of oppositely facing pistons in each bore, means for admitting fluid pressure to the bores between the pistons to force them outwardly for engagement of the clutch, the gear being a ring gear surrounding said hub, and a pair of side plates rotatable relative to the shaft and turning with said gear and disposed on opposite sides of said hub to form an enclosing drum for said hub, said side plates providing surfaces on the inner side thereof on opposite sides of the hub for frictional driving engagement with the head ends of the pistons.

7. A clutch for drivingly connecting a gear and shaft, comprising a hub turning with the shaft having bores provided therein substantially parallel to the axis of rotation, a pair of oppositely facing pistons in each bore, means for admitting fluid pressure to the bores between the pistons to force them outwardly for engagement of the clutch, the gear being a ring gear surrounding the hub, a pair of side plates rotatable relative to the shaft and turning with said gear and disposed on opposite sides of said hub to form an enclosing drum for said hub, said side plates providing surfaces on the inner side thereof on opposite sides of the hub for frictional driving engagement with the head ends of the pistons, spring means normally urging the pistons inwardly toward each other to retracted position, and means for delivering fluid to the inside of the drum at a point near the axis of rotation and draining the fluid from the drum at the periphery thereof.

8. A clutch adapted for use in a hydraulic turbo ring drive for transmitting drive from a driving element to a driven element, comprising a hub member turning with one of said elements, a drum member turning with the other of said elements and enclosing the hub member, pistons movable in bores provided in one of said members and arranged to have frictional driving engagement with surfaces provided on the other of said members, and means for admitting fluid under high pressure to the bores to cause engagement of said pistons with said surfaces, whereby substantially no slip energy in the transmission of power is absorbed in said clutch.

9. A clutch as set forth in claim 8, wherein the pistons have engaging surfaces of such small area in relation to the fluid pressure applied, whereby the friction surface pressure in the clutch is upwards of one hundred pounds per square inch.

10. A clutch for use between a driving member and a driven member, comprising a hub turning with one of said members having bores provided therein substantially parallel to the axis of rotation, a pair of oppositely facing pistons in each bore, means for admitting fluid pressure to the bores between the pistons to force them outwardly for engagement of the clutch, a drum turning with the other of said first mentioned members enclosing the hub and including side plates on opposite sides of the hub which provide friction surfaces on the inner sides thereof for frictional driving engagement with the head ends of the pistons, said side plates being distortable outwardly with respect to the hub under pressure of said pistons, and thrust rings mounted on the first mentioned member on opposite sides of the hub in spaced relation to the side plates and arranged to have engagement with the outer sides of said side plates to limit outward distortion thereof.

11. A clutch for use between a driving member and a driven member, comprising a hub turning with one of said members having bores provided therein substantially parallel to the axis of rotation, a pair of oppositely facing pistons in each bore, means for admitting fluid pressure to the bores between the pistons to force them outwardly for engagement of the clutch, a drum turning with the other of said first mentioned members enclosing the hub and including side plates on opposite sides of the hub which provide friction surfaces on the inner sides thereof for frictional driving engagement with the head ends of the pistons, said side plates being distortable outwardly with respect to the hub under pressure of said pistons, and means for taking up the thrust, arranged on the first mentioned member on opposite sides of the hub in spaced relation to the side plates and arranged to have engagement with said side plates to limit outward distortion thereof.

HEINRICH SCHNEIDER.